United States Patent [19]

Honoki et al.

[11] Patent Number: 5,111,714
[45] Date of Patent: May 12, 1992

[54] TORSIONAL DAMPER TYPE FLYWHEEL DEVICE

[75] Inventors: Shinji Honoki, Nagoya; Katsuyuki Kobayashi, Aichi; Mitsuhiro Umeyama; Toshihiro Ootake, both of Toyota, all of Japan

[73] Assignee: Toyota Jidosha Kabushiki Kaisha, Toyota, Japan

[21] Appl. No.: 580,796

[22] Filed: Sep. 11, 1990

[30] Foreign Application Priority Data

Sep. 11, 1989 [JP] Japan .................. 1-105313[U]
Sep. 11, 1989 [JP] Japan .................. 1-105314[U]
Sep. 11, 1989 [JP] Japan .................. 1-105315[U]

[51] Int. Cl.$^5$ .......................... F16D 3/14; F16F 15/12
[52] U.S. Cl. .................... 74/574; 192/106.2; 464/68
[58] Field of Search .................. 74/573 R, 574; 192/106.2; 464/64, 66, 68

[56] References Cited

U.S. PATENT DOCUMENTS

| | | | |
|---|---|---|---|
| 4,748,868 | 6/1988 | Kobayashi et al. | 74/574 |
| 4,767,380 | 8/1988 | Chasseguet et al. | 464/68 |
| 4,932,921 | 6/1990 | Kobayashi et al. | 74/574 X |
| 4,950,204 | 8/1990 | Umeyama et al. | 464/68 |
| 4,950,205 | 8/1990 | Umeyama et al. | 74/574 X |
| 4,972,734 | 11/1990 | Hyodo et al. | 74/574 |
| 5,025,680 | 6/1991 | Umeyama et al. | 74/574 |
| 5,032,107 | 7/1991 | Umeyama et al. | 192/106.2 X |

FOREIGN PATENT DOCUMENTS

| | | |
|---|---|---|
| 60-139945 | 9/1985 | Japan . |
| 60-142338 | 9/1985 | Japan . |
| 63-42950 | 3/1988 | Japan . |
| 63-53033 | 4/1988 | Japan . |
| 63-201246 | 12/1988 | Japan . |
| 64-45045 | 3/1989 | Japan . |

Primary Examiner—Dwight Diehl
Attorney, Agent, or Firm—Cushman, Darby & Cushman

[57] ABSTRACT

A torsional damper type flywheel device including a drive side flywheel, a driven side flywheel rotatable relative to the drive side flywheel, at least one kind of spring mechanism connected between the drive side and driven side flywheels, and a friction mechanism arranged in series with the spring mechanism. An inertial plate is fastened to the drive side flywheel so as to construct one portion of the drive side flywheel so that a mass center of the drive side flywheel is shifted to an engine side to prevent the drive side flywheel from being deformed to an engine side when rotated at high speeds. Further, the engine side drive plate is bent at its radially intermediate portion so that a radially outer portion of the drive plate approaches the axial center of the drive side flywheel. As a result, an axial increase in width of the flywheel device due to the provision of the inertial plate is minimized. Further, a friction mechanism of the flywheel device is improved by integrally forming a thrust lining with a centering bushing and contacting only a radially outer portion of a cone spring with a thrust plate.

35 Claims, 6 Drawing Sheets

TORSIONAL DAMPER TYPE FLYWHEEL DEVICE

BACKGROUND OF THE INVENTION

1. Field of the Invention

The present invention relates to a torsional damper type flywheel device divided into two masses coupled to each other via a torsional spring.

2. Description of the Related Art

A prior art torsional damper type flywheel device is disclosed in, for example, Japanese Utility Model Publication SHO 63-42950. The flywheel device, as illustrated in FIGS. 8 (Prior Art) and 9 (Prior Art), includes a drive side flywheel 10', a driven side flywheel 20' rotatable relative to the drive side flywheel 10', a K spring mechanism 30' directly connected between the drive side and driven side flywheels, a K1 spring mechanism disposed parallel to the K spring mechanism, and a friction mechanism disposed in series with the K1 spring mechanism so that the series combination of the K1 spring and the friction mechanism is connected between the drive side and driven side flywheels.

The drive side flywheel 10' includes an outer ring 12', an inner ring 14' disposed radially inside outer ring 12', an engine side drive plate 16' and a clutch side drive plate 18'. The drive plates 16' and 18' are fastened to the outer ring 12' by a plurality of rivets 15'. The drive plates 16' and 18' are constructed of steel for the purpose of increasing the structural reliability and reducing an axial length of the flywheel device. The inner ring 14' and engine side drive plate 16' are fastened to an engine crankshaft by a plurality of bolts. Windows 17' and 19' for supporting the K and K1 spring mechanisms therein are formed in the engine side drive plate 16' and clutch side drive plate 18', respectively.

Figure 8:
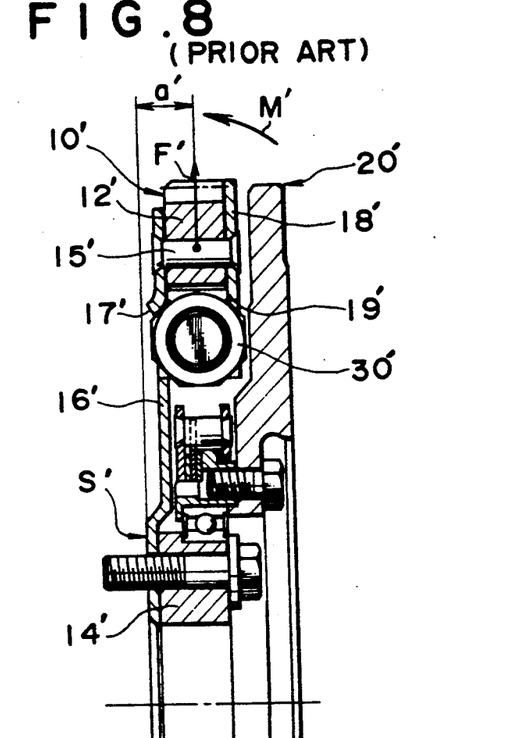
FIG. 8 (Prior Art) is an upper half cross-sectional view of a prior art torsional damper type flywheel device except a step-like structure of an engine side drive plate which is not a known structure.
Figure 9:
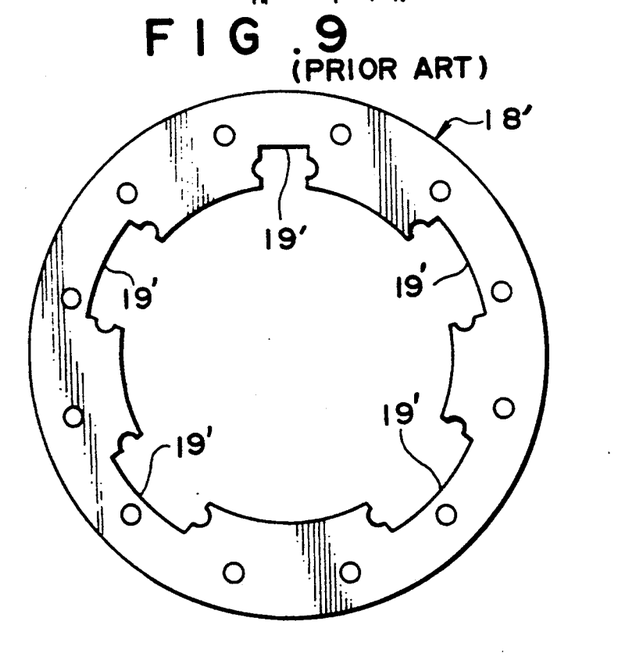
FIG. 9 (Prior Art) is a front elevational view of a clutch side drive plate of a drive side flywheel of the flywheel device of FIG. 8.

However, as seen from FIG. 8 (Prior Art), the inertial mass of the assembly of the drive side flywheel 10' and the spring mechanisms is axially spaced from a surface S' of the flywheel device contacting the engine crankshaft by a distance a'. As a result, when the flywheel device is rotated at high speeds and a centrifugal force F' arts on a center of the inertial mass of the assembly of the drive side flywheel 10' and the spring mechanisms, a moment M' (M' = F' * a') causes the drive side flywheel 10' to axially incline toward the engine crankshaft side, because the engine side drive plate 16' is constructed of a thin steel plate and can easily be deformed.

SUMMARY OF THE INVENTION

An object of the invention is to provide a torsional damper type flywheel device having a drive side flywheel with an engine side drive plate constructed of steel wherein the drive side flywheel is prevented from axially inclining when rotated at high speeds.

Another object of the invention is to provide a torsional damper type flywheel device which can attain the above-described prevention of the inclining of the engine side flywheel without increasing the axial size of the flywheel device.

Some improvements of structural components, for example, a friction mechanism, will be necessary to maintain the axial size of the flywheel device compact without degrading the operation of the flywheel device. Another object of the invention is to provide such improvements of the friction mechanism.

In accordance with the present invention, the object can be attained by a torsional damper type flywheel device including a drive side flywheel, a driven side flywheel coaxial with and rotatable relative to the drive side flywheel, and at least one kind of torsional spring mechanism connected between the drive side flywheel and the driven side flywheel. The drive side flywheel includes an outer ring, an inner ring disposed radially inside the outer ring, an engine side drive plate constructed of steel and disposed on an engine side of the outer ring, and a clutch side drive plate disposed on a clutch side of the outer ring. The engine side drive plate and the clutch side drive plate are fastened to the outer ring by a plurality of rivets, and the inner ring is fastened to the engine side drive plate. The drive side flywheel further includes an inertial plate disposed on an engine side of the engine side drive plate. The inertial plate is fastened to the assembly of the outer plate and the engine side and clutch side drive plates by the rivets.

Each of the engine side drive plate and the driven plate is bent at a radially intermediate portion thereof so that a radially outer portion thereof approaches a center of the flywheel device in an axial direction of the flywheel device.

A friction mechanism is further provided in series with the spring mechanism. The friction mechanism includes two thrust linings, a thrust plate, and a cone spring. One of the two thrust linings is integrally formed with an axially extending cylindrical centering portion. The cone spring presses the thrust plate at a radially outermost portion of the cone spring. The thrust plate is bent toward a radially outside portion of the cone spring at a radially outer portion of the thrust plate to form a step-like portion which guides the cone spring from the radially outside portion of the cone spring.

Since the inertial plate is provided, the center of the inertial mass of the drive side flywheel, including the inertial plate and the spring mechanism, is shifted to an engine side by a certain amount so that a moment acting on the engine side drive plate is decreased.

In a case where the engine side and clutch side drive plates of the drive side flywheel are bent at the radially intermediate portions thereof so that the radially outer portions of the engine side and clutch side drive plates approach the axial center of the drive side flywheel, the axial length of the drive side flywheel is prevented from increasing to a great extent despite the coupling of the inertial plate to the engine side drive plate, because the inertial plate is coupled to the engine side drive plate at the radially outer portion of the engine side drive plate.

In a case where the above-described improvements of the friction mechanism are made, the thrust lining is centered to decrease abrasion of the lining. Further, an actual operating diameter of the cone spring is made large and the cone spring load is minimized so that durability of the cone spring is improved. Furthermore, the thrust plate can center the cone spring to prevent the occurrence of a non-uniform abrasion.

BRIEF DESCRIPTION OF THE DRAWINGS

The above and other objects, features and advantages of the present invention will become more apparent and will be more readily appreciated from the following detailed description of the preferred embodiments of the invention taken in conjunction with the accompanying drawings, wherein like components are denoted by like reference numbers, in which.

DETAILED DESCRIPTION OF THE PREFERRED EMBODIMENTS

Figure 1:
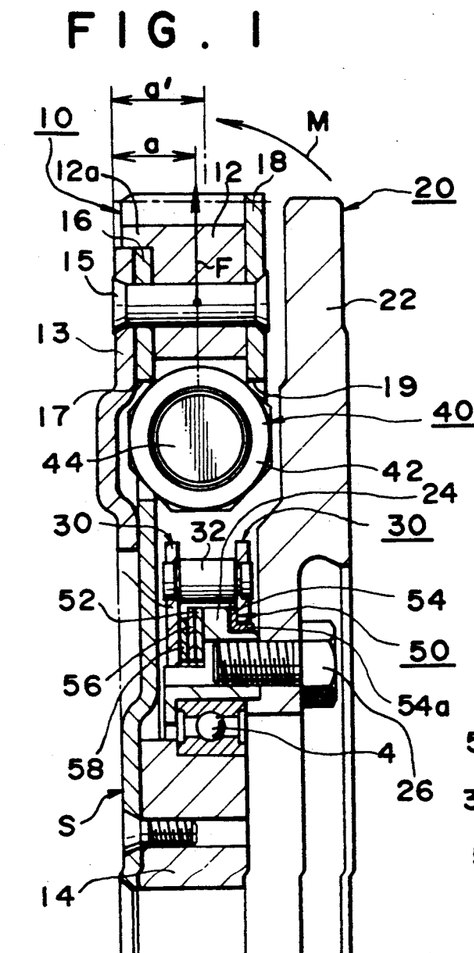
FIG. 1 is an upper half cross-sectional view of a torsional damper type flywheel device in accordance with a first embodiment of the present invention.

With reference to FIGS. 1 to 5, a torsional damper type flywheel device in accordance with the first embodiment of the invention will be explained. As illustrated in FIG. 1, the torsional damper type flywheel device generally includes a drive side flywheel 10, a driven side flywheel 20 coaxial with and rotatable relative to the drive side flywheel 10, and at least one kind of spring mechanism 40 (a K spring, hereinafter) connected between the drive side flywheel 10 and driven side flywheel 20.

The flywheel device may further include a control plate 30 rotatable relative to the drive side and driven side flywheels 10 and 20, a friction mechanism 50, and another kind of spring mechanism (not shown) which will be called a K1 spring hereinafter. The K spring 40 is directly connected between the drive side and driven side flywheels 10 and 20. The K1 spring is arranged in series with friction mechanism 50 to form an elastically connected Coulomb damper. The series combination of the K1 spring and friction mechanism 50 is connected between the drive side and driven side flywheels 10 and 20 in parallel with the K spring 40. The K1 spring and friction mechanism 50 are connected to each other via control plate 30.

The parallel arrangement of the K spring 40 and the elastically connected friction mechanism 50 provides two kinds of vibrational characteristics: a K characteristic and a K+K1 characteristic. When the torque acting on the K1 spring is small, for example, at a standard range of engine speeds, the friction mechanism 50 does not slide. As a result, both K spring 40 and the K1 spring operate so that the flywheel device operates in accordance with the K+K1 characteristic. Since no frictional force exists in the K+K1 characteristic, an excellent torque variation absorbing effect is obtained. When the engine speed approaches the resonance point of the K+K1 characteristic during an engine start-up and stopping and therefore the torque acting on the K1 spring becomes great, the friction mechanism 50 momentarily slides to make the K1 spring ineffective, so that the flywheel device changes its characteristic from the K+K1 characteristic to the K characteristic, thereby passing through the resonance point of the K+K1 characteristic without causing a resonance.

Structures of the components of the flywheel device will be explained in more detail with reference to FIGS. 1 and 2. The drive side flywheel 10 is coupled to an engine crankshaft by a plurality of blots 2. The drive side flywheel 10 includes an outer ring 12 including a ring gear, an inner ring 14 disposed radially inside outer ring 12, an engine side drive plate 16 disposed on an engine side of the outer ring 12, and a clutch side drive plate 18 disposed on a clutch side of the outer ring 12. The engine side and clutch side drive plates 16 and 18 are constructed of steel to reduce the thickness of each plate without reducing the structural reliability. The engine side and clutch side drive plates 16 and 18 are fastened to the outer ring 12 by a plurality of rivets 15. The inner ring 14 is fastened to an engine crankshaft together with the engine side drive plate 16. The engine side and clutch side drive plates 16 and 18 include windows 17 and 19, respectively, for housing the K spring mechanism 40 therein.

As illustrated in FIG. 1, the drive side flywheel 10 further includes an annular inertial plate 13 which is coupled to the assembly of the outer ring 12 and the drive plates 16 and 18 from the engine side of the assembly. The inertial plate 13 is fixed to the drive plate 16 using the same rivets 15 that are used for coupling the drive plates 16 and 18 to the outer ring 12. The inertial plate 13 covers the windows 17 from an engine crankshaft side so as to prevent dust from entering the interior of the flywheel device through the windows 17 and also provides a guide for the K springs 40 housed in the windows 17. Since the inertial plate 13 is provided, a center of the inertial mass of the drive side flywheel 10 is shifted to an engine crankshaft side in an axial direction of the flywheel device. As a result, an axial distance a between the axial inertial mass center of drive side flywheel 10 and a surface S of the drive side flywheel contacting the engine crankshaft is reduced in comparison with the axial distance a' (see FIG. 8 (Prior Art)) of the conventional flywheel device. This reduction of the axial distance also decreases the magnitude of a moment M which will be generated on the drive side flywheel when it is rotated at high speeds.

Figure 5:
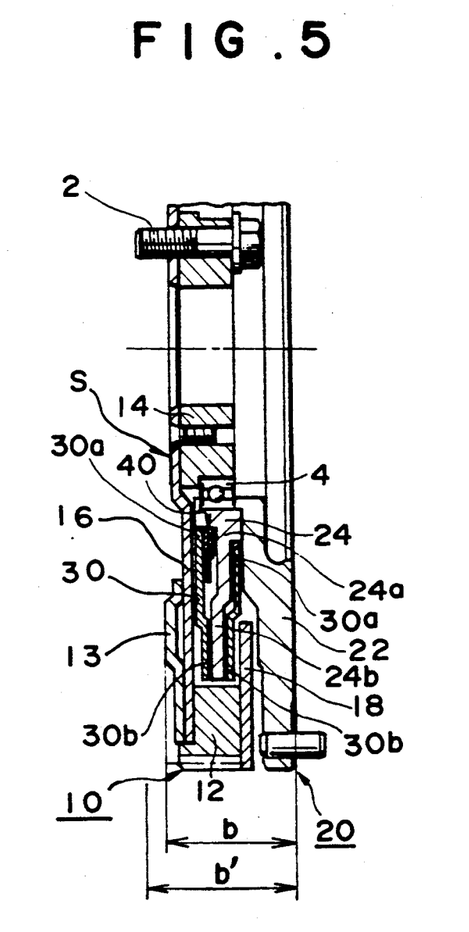
FIG. 5 is a cross-sectional view of the flywheel device illustrating a reduction in the axial length thereof.

For the purpose of preventing the axial size of the flywheel device from being increased due to the provision of inertial plate 13, a step-like portion is formed at a radially intermediate portion of the engine side drive plate 16. As a result, a radially outer portion of the engine side drive plate 16 located radially outside the step-like portion approaches toward the axial center of the flywheel device. Since the inertial plate 13 is coupled to the assembly of the drive plates 16 and 18 and the outer ring 12 at the radially outer portion of engine side drive plate 16, an increase in the axial size of the flywheel device is minimized. FIG. 5 illustrates that the axial dimension b of the flywheel device with the step-like portion in engine side drive plate 16 is smaller than an axial dimension b' of a flywheel device without a step-like portion in the engine side drive plate 16 which will be explained hereinafter with reference to FIG. 6 as the second embodiment of the present invention.

As illustrated in FIG. 1, a radially outer portion of the outer ring 12 extends toward an engine crankshaft to form an axial protrusion 12a. A radially outer surface of the inertial plate 13 and a radially outer surface of the engine side drive plate 16 engage a radially inner surface of the axial protrusion 12a. Due to the axial protrusion 12a, the inertial mass center is further shifted toward an engine crankshaft so that the moment M is further reduced. Further, since the axial protrusion 12a can bear a radial force due to the engagement between the inner surface of axial protrusion 12a and the outer surfaces of inertial plate 13 and engine side drive plate 16, a shear force which may act on the rivets 15 when the drive side flywheel 10 is rotated at high speeds will be reduced to a great extent, and the structural reliability of the drive side flywheel 10 increases.

Figure 3:
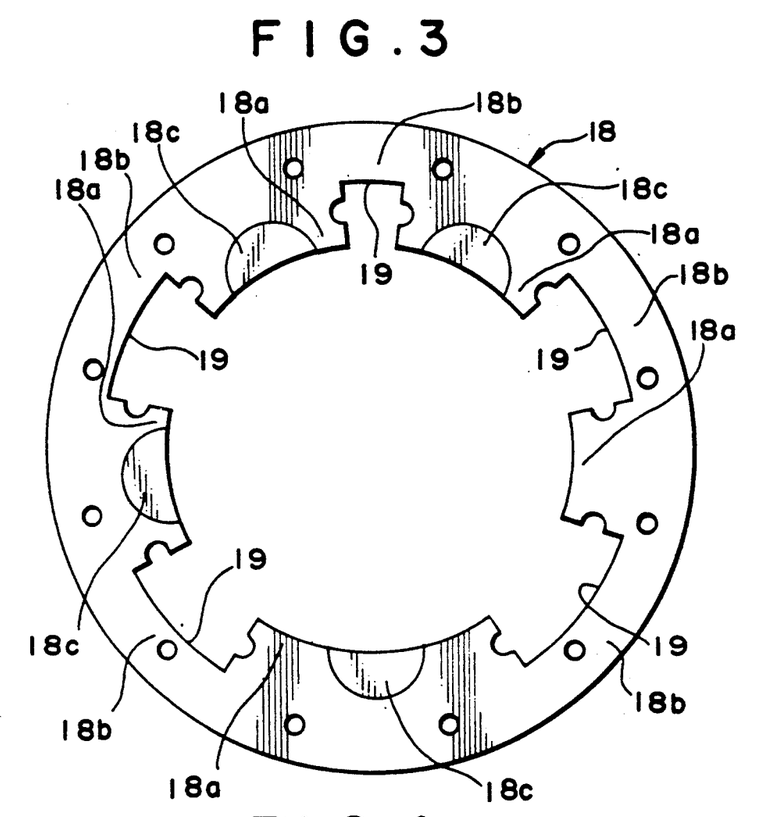
FIG. 3 is a front elevational view of a clutch side drive plate of a drive side flywheel of the flywheel device of FIG. 1.

As illustrated in FIG. 3, the clutch side drive plate 18 includes locally thinned portions 18c at a radially inner portion thereof and circumferentially between the windows 19. The locally thinned portions make the clutch side drive plate lighter further shifting the inertial mass center toward the engine crankshaft so that the moment M is further reduced. The locations of the locally thinned portions 18c are determined to maximize a rotational balance. The clutch side drive plate 18 includes first portions 18a with a greater width and second portions 18b with a smaller width. Since the thinned portions 18c are formed at radially inner portions of the first portions 18a, a stress line generated in the outer portion of the clutch side drive plate 18 is prevented from flowing toward radially inside corners of the windows 19. As a result, local stress concentration is unlikely to be caused at the corners of the windows 19, and the structural durability of the clutch side drive plate 18 increases.

The driven side flywheel 20 is coupled to a power train of a vehicle via a clutch. The driven side flywheel 20 includes a flywheel body 22 axially opposing the drive side flywheel 10 and a driven plate 24 coupled to the flywheel body 22 by a plurality of bolts 26. The drive side flywheel 20 is rotatably supported by the inner ring 14 of the drive side flywheel 10 via a bearing 4 so that the drive side and driven side flywheels 10 and 20 are rotatable relative to each other about the axis of the flywheel device.

The control plate 30 includes a pair of control plate elements coupled to each other by a plurality of rivets 32. Each control plate element includes an annular portion 30a and an arm 30b extending radially outwardly from the annular portion 30a. The control plate 30 detachably engages the K1 spring mechanism in a circumferential direction of the flywheel device at the arm 30b. The control plate 30 also slidably engages the friction mechanism 50 at the annular portion 30a so that the K1 spring and the friction mechanism 50 are connected to each other via the control plate 30. Each control plate element includes a step-like portion at a radially intermediate portion thereof so that a radially outer portion of each control plate element located radially outside the step-like portion approaches the axial center of the flywheel device. This structure helps to minimize the axial size of the flywheel device.

Each K spring mechanism 40 includes a K spring 42 extending in the circumferential direction of the flywheel device and spring seats 44 disposed at opposite ends of the K spring 42. Each K spring mechanism 40 is directly connected between the drive side and driven side flywheels 10 and 20. Thus, a torque is transmitted between the drive side and driven side flywheels 10 and 20 via two routes: a first route including the K spring mechanism 40 and a second route including the K1 spring mechanism, control plate 30 and friction mechanism 50 (an elastically connected Coulomb damper) which is arranged parallel to the first route. Both the K spring mechanism 40 and the K1 spring mechanism are housed in the windows formed in the drive plates of the drive side flywheel 10 so as to be detachable from the window defining walls in the circumferential direction of the flywheel device.

The friction mechanism 50 is located between the annular portion 30a of the control plate 30 and an annular portion 24a of the driven plate 24 of the driven side flywheel 20. The friction mechanism 50 is arranged in series with the K1 spring so that it comprises an elastically connected Coulomb damper which only momentarily slides when a torque acting on the friction mechanism 50 exceeds a predetermined frictional force Fr. The friction mechanism 50 includes a thrust lining 54 located between the annular portion 24a of the driven plate 24 and the annular portion 30a of one of the control plate elements, another thrust lining 52 located between the annular portion 24a of the driven plate 24 and the annular portion 30a of the other of the control plate elements, a thrust plate 56, and a cone spring 58. The thrust linings 52 and 54 are constructed of abrasive material, and the thrust plate 56 and the cone spring 58 are constructed of metal.

Figure 10:
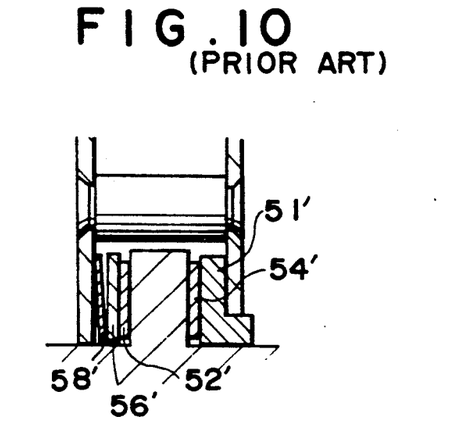
FIG. 10 (Prior Art) is a cross-sectional view of a friction mechanism of the flywheel device of FIG. 8.
Figure 11:
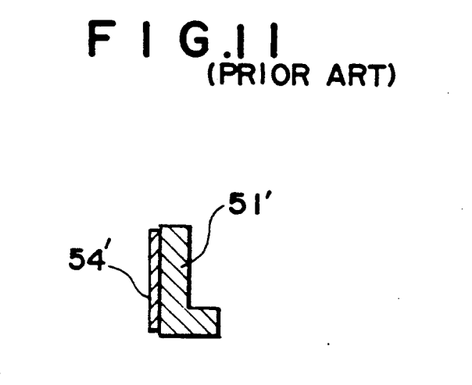
FIG. 11 (Prior Art) is a cross-sectional view of a centering bush and a thrust lining of the friction mechanism of FIG. 10.

In one of the thrust linings 54, a centering bushing 54a is integrally formed. An inner surface of the centering bushing 54a slidably contacts an outer surface of the annular portion 24a of the driven plate 24 so as to center the thrust lining 54, and an outer surface of the centering bushing 54a slidably contacts an inner surface of the annular portion 30a of one of the control plate elements. For the purpose of understanding the features of the friction mechanism 50 of the flywheel device of the present invention, FIGS. 10 (Prior Art) and 11 (Prior Art) illustrate the structures of a friction mechanism of the conventional flywheel device. In the conventional device, a centering bushing 51' separate from a lining 54' are bonded to each other. When the two members 51' and 54' are bonded in manufacture thereof, misalignment may happen between the two members. If such a misalignment exists, eccentric abrasion of the two members will occur, which will decrease the life of the friction mechanism 50. In contrast, in the present invention, since the centering bushing 54a is integrally formed in the thrust lining 54, misalignment between the centering bushing 54a and the thrust lining 54 does not happen and the durability of the friction mechanism 50 increases.

An area of the cone spring 58 which presses the thrust plate 56 is limited to a radially outer portion of the cone spring 58. In contrast, the conventional cone spring 58' presses the thrust plate 56' at a radially inner portion of the cone spring 58'. Since the cone spring 58 presses the thrust plate 56 at a radially outer portion of the cone spring 58, an actual diameter of the press circle is increased and a load generated in the cone spring 58 is decreased. This improves the durability of the cone spring 58.

Figure 12:
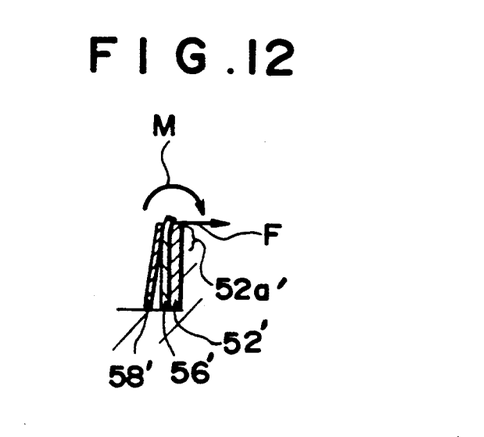
FIG. 12 is a cross-sectional view of a thrust plate and a cone spring of a friction mechanism of a hypothetical flywheel device.

A width of the thrust plate 56 in the radial direction is increased in comparison with that of the conventional thrust plate 56'. FIG. 12 illustrates what kind of deformation would be caused if the width of the thrust plate 56' which was contacted by an outer portion of the cone spring 58' were not increased. A radially outermost portion of the thrust plate 56' would receive a force F and a moment M from the cone spring 58' and would be deformed toward a thrust lining 52', and a radially outer portion 52a' of the thrust lining 52' would be severely abraded. In contrast, since the thrust plate 56 is increased in the radial width in the present invention, such a deformation of the thrust plate 56 does not happen and the durability of the friction mechanism 50 increases.

Figure 2:
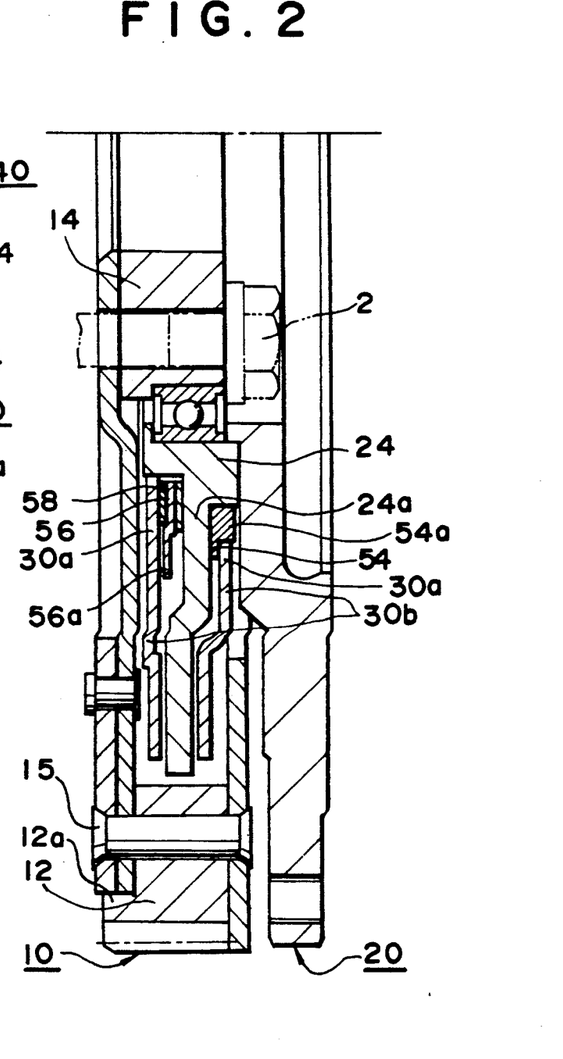
FIG. 2 is a lower half cross-sectional view of the torsional damper type flywheel device in accordance with the first embodiment of the present invention.
Figure 4:
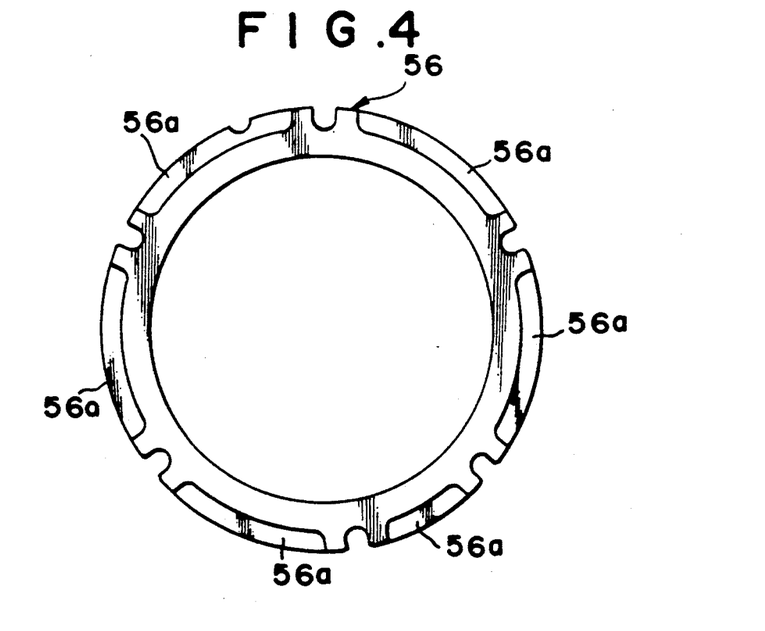
FIG. 4 is a front elevational view of a thrust plate of a friction mechanism of the flywheel device of FIG. 1.

As illustrated in FIGS. 2 and 4, a step-like portion is formed in the thrust plate 56 to form a radially outer portion 56a axially staggered with respect to a radially inner portion. An inner surface of the radially outer portion 56a engages an outer surface of the cone spring 58 so that the cone spring 58 is centered relative to the thrust plate 56. Formation of the step-like portion increases the rigidity of the thrust plate 56 and the centering of the cone spring 58 assures a stable operation of the friction mechanism 50 through which the durability of the friction mechanism 50 is increased.

Figure 6:
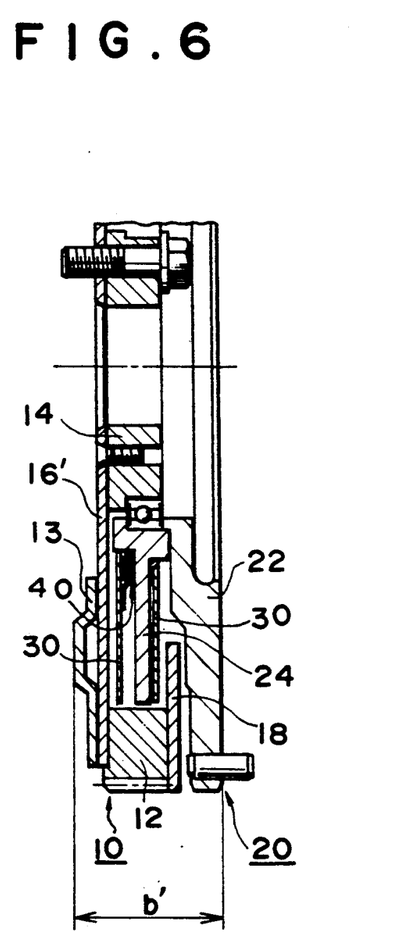
FIG. 6 is a lower half cross-sectional view of a flywheel device in accordance with a second embodiment of the present invention.

FIG. 6 illustrates a flywheel device in accordance with a second embodiment of the present invention. In the second embodiment, an engine side drive plate 16' does not include a step-like portion, though an inertial plate 13 is provided to the drive side flywheel 10. Therefore, the axial size of the drive side flywheel 10 is not as minimized as in the first embodiment. Since the other structures are the same as those of the first embodiment, detailed descriptions therefore will be omitted.

Figure 7:
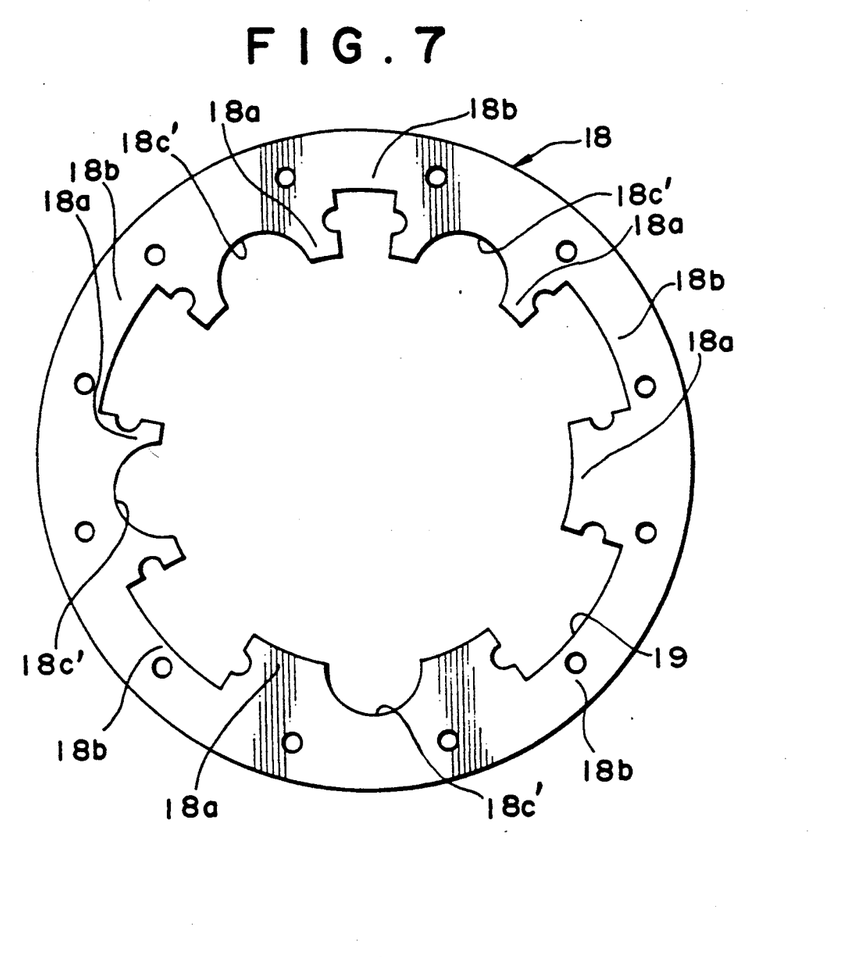
FIG. 7 is a front elevational view of a clutch side drive plate of a drive side flywheel of a torsional damper type flywheel device in accordance with a third embodiment of the present invention.

FIG. 7 illustrates a clutch side drive plate 18 of a flywheel device in accordance with a third embodiment of the present invention. In the third embodiment, the thinned portion 18c formed in the clutch side drive plate 18 according to the first embodiment is substituted by a cut, removed portion 18c' so that the cut portion constructs a radially inwardly opening recess in the clutch side drive plate 18. In the third embodiment, the axial center of inertial mass of the drive side flywheel 10 is shifted more to an engine crankshaft side than in the first embodiment. Since the other structures are the same as those of the first embodiment, detailed descriptions therefore will be omitted.

Among the above-described structures, the provision of the inertial plate 13 for axially balancing the drive side flywheel 10, the step-like structure of the engine side drive plate 16 for minimizing the axial size of the drive side flywheel 10, the integral formation of the centering bushing 54a with the thrust lining 54, the limitation of the pressing area of the cone spring 58 to the radially outermost portion thereof, and the centering of the cone spring 58 by the outer portion 56a of the thrust plate 56 can be applied to any other type of torsional damper type flywheel device, for example, a flywheel device having only one kind of spring mechanism as opposed to the flywheel device having two kinds of spring mechanisms in accordance with the above-described embodiment.

Although a few embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A torsional damper type flywheel device comprising:
    a drive side flywheel including an outer ring, an inner ring disposed radially inside the outer ring, an engine side drive plate disposed on an engine side of the outer ring, and a clutch side drive plate disposed on a clutch side of the outer ring, the engine side drive plate and the clutch side drive plate being fastened to the outer ring, the inner ring being fastened to the engine side drive plate, the drive side flywheel further including an inertial plate disposed on an engine side of the engine side drive plate, the inertial plate being fastened to the assembly of the outer ring, the engine side drive plate and the clutch side drive plate;
    a driven side flywheel coaxial with and rotatable relative to the drive side flywheel, and
    at least one spring mechanism connected between the drive side flywheel and the driven side flywheel.

2. The torsional damper type flywheel device according to claim 1, wherein the engine side drive plate includes at least one window formed therein for supporting the spring mechanism therein, the inertial plate covering the window from an engine side.

3. The torsional damper type flywheel device according to claim 1, wherein a radially outer portion of the outer ring axially protrudes toward an engine side, a radially inner surface of the axial protrusion of the outer ring contacting a radially outer surface of the engine side drive plate and a radially outer surface of the inertial plate.

4. The torsional damper type flywheel device according to claim 1, wherein the clutch side drive plate includes a plurality of radially inwardly opening windows for supporting the spring mechanism therein, the clutch side drive plate including smaller width portions located radially outside the windows and greater width portions located circumferentially between the smaller width portions so as to connect adjacent two smaller width portions to each other, radially inner portions of the greater width portions being locally formed thinner in thickness than the remaining portions of the clutch side drive plate.

5. The torsional damper type flywheel device according to claim 1, wherein the clutch side drive plate includes a plurality of radially inwardly opening windows for supporting the spring mechanism therein, the clutch side drive plate including smaller width portions located radially outside the windows and greater width portions located circumferentially between the smaller width portions so as to connect adjacent two smaller width portions to each other, radially inner portions of the greater width portions being locally cut so as to form radially inwardly opening recesses in the clutch side drive plate.

6. The torsional damper type flywheel device according to claim 1, wherein the engine side drive plate is bent at a radially intermediate portion thereof so that a radially outer portion of the engine side drive plate axially approaches an axial center of the flywheel device, the inertial plate being coupled to the radially outer portion of the engine side drive plate by at least one rivet.

7. The torsional damper type flywheel device according to claim 1, wherein the spring mechanism is a K spring.

8. The torsional damper type flywheel device according to claim 1, wherein the spring mechanism is a K1 spring.

9. The torsional damper type flywheel device according to claim 8, and further comprising a control plate coaxial with and rotatable relative to the drive side flywheel and the driven side flywheel, the driven side flywheel including a drive plate, wherein the K1 spring is parallel to a K spring connected between the drive side flywheel and the driven side flywheel, each of the engine side drive plate, the driven plate and the control plate being bent at a radially intermediate portion thereof so that a radially outer portion thereof axially approaches an axial center of the flywheel device.

10. The torsional damper type flywheel device according to claim 1, and further comprising a friction mechanism arranged in series with the spring mechanism so that the series combination of the spring mechanism and the friction mechanism is connected between the drive side flywheel and the driven side flywheel.

11. The torsional damper type flywheel device according to claim 10, wherein the friction mechanism comprises:
   a plurality of thrust linings, at least one of which is formed integrally with an axially extending bushing portion;
   a thrust plate; and
   a cone spring.

12. The torsional damper type flywheel device according to claim 11, wherein the cone spring presses the thrust plate at a radially outermost portion of the cone spring, the thrust plate being bent toward a radially outside portion of the cone spring to form a step-like portion at a radially intermediate portion of the thrust plate, an inner surface of a radially outer portion of the thrust plate located outside of the step-like portion contacting an outer surface of the cone spring to center the cone spring with respect to the thrust plate.

13. A torsional damper type flywheel device comprising:
   a drive side flywheel including an engine side drive plate and an inertial plate disposed on an engine side of the engine side drive plate;
   a driven side flywheel coaxial with and rotatable relative to the drive side flywheel, the driven side flywheel including a driven plate;
   a control plate coaxial with and rotatable relative to the drive side flywheel and the driven side flywheel;
   at least one K spring connected between the drive side flywheel and the driven side flywheel;
   at least one K1 spring connected between the control plate and one of the drive side flywheel and the driven side flywheel, the K1 spring being parallel to the K spring, each of the engine side drive plate, the driven plate and the control plate being bent at a radially intermediate portion thereof so that a radially outer portion thereof axially approaches an axial center of the flywheel device.

14. The torsional damper type flywheel device according to claim 13, wherein the engine side drive plate includes at least one window formed therein for supporting the K spring and the K1 spring therein, the inertial plate covering the window from an engine side.

15. The torsional damper type flywheel device according to claim 13, wherein the engine side drive plate is bent at a radially intermediate portion thereof so that a radially outer portion of the engine side drive plate axially approaches an axial center of the flywheel device, the inertial plate being coupled to the radially outer portion of the engine side drive plate.

16. The torsional damper type flywheel device according to claim 13, and further comprising a friction mechanism arranged in series with the spring mechanism so that the series combination of the spring mechanism and the friction mechanism is connected between the drive side flywheel and the driven side flywheel.

17. The torsional damper type flywheel device according to claim 16, wherein the friction mechanism comprises:
   a plurality of thrust linings, at least one of which is formed integrally with an axially extending centering bushing portion;
   a thrust plate; and
   a cone spring.

18. The torsional damper type flywheel device according to claim 17, wherein the cone spring presses the thrust plate at a radially outermost portion of the cone spring, the thrust plate being bent toward a radially outside portion of the cone spring to form a step-like portion at a radially intermediate portion of the thrust plate, an inner surface of a radially outer portion of the thrust plate located outside of the step-like portion contacting an outer surface of the cone spring to center the cone spring with respect to the thrust plate.

19. The torsional damper type flywheel device according to claim 13, wherein the drive side flywheel includes an outer ring, an inner ring disposed radially inside the outer ring, and a clutch side drive plate disposed on a clutch side of the outer ring, the engine side drive plate being disposed on an engine side of the outer ring, the engine side drive plate and the clutch side drive plate being fastened to the outer ring by at least one rivet, the inner ring being fastened to the engine side drive plate, the inertial plate being fastened to the assembly of the outer ring, the engine side drive plate and the clutch side drive plate by the rivet.

20. The torsional damper type flywheel device according to claim 19, wherein a radially outer portion of the outer ring axially protrudes toward an engine side, a radially inner surface of the axial protrusion of the outer ring contacting a radially outer surface of the engine side drive plate and a radially outer surface of the inertial plate.

21. The torsional damper type flywheel device according to claim 19, wherein the clutch side drive plate includes a plurality of radially inwardly opening windows for supporting the K spring and the K1 spring therein, the clutch side drive plate including smaller width portions located radially outside the windows and greater width portions located circumferentially between the smaller width portions so as to connect adjacent two smaller width portions to each other, radially inner portions of the greater width portions being locally formed thinner in thickness than the remaining portions of the clutch side drive plate.

22. The torsional damper type flywheel device according to claim 19, wherein the clutch side drive plate includes a plurality of radially inwardly opening windows for supporting the K spring and the K1 spring therein, the clutch side drive plate including smaller width portions located radially outside the windows and greater width portions located circumferentially between the smaller width portions so as to connect adjacent two smaller width portions to each other, radially inner portions of the greater width portions being locally cut so as to form radially inwardly opening recesses in the clutch side drive plate.

23. A torsional damper type flywheel device comprising:
   a drive side flywheel;
   a driven side flywheel coaxial with and rotatable relative to the drive side flywheel;
   at least one spring mechanism disposed between the drive side flywheel and the driven side flywheel; and
   a friction mechanism arranged in series with the spring mechanism so that the series combination of the spring mechanism and the friction mechanism is connected between the drive side flywheel and the driven side flywheel, the friction mechanism including at least one thrust lining, a thrust plate, and a cone spring, at least one of the at least one thrust lining being integrally formed with a centering bushing portion.

24. The torsional damper type flywheel device according to claim 23, wherein the centering bushing portion comprises an axially extending cylindrical bushing portion.

25. The torsional damper type flywheel device according to claim 23, wherein the cone spring presses the thrust plate at a radially outermost portion of the cone spring, the thrust plate being bent toward a radially outside portion of the cone spring to form a step-like portion at a radially intermediate portion of the thrust plate, the inner surface of a radially outer portion of the thrust plate located outside of the step-like portion contacting an outer surface of the cone spring to center the cone spring with respect to the thrust plate.

26. The torsional damper type flywheel device according to claim 23, wherein the spring mechanism is a K spring.

27. The torsional damper type flywheel device according to claim 23, wherein the spring mechanism is a K1 spring.

28. The torsional damper type flywheel device according to claim 23, wherein the drive side flywheel device includes an outer ring, an inner ring disposed radially inside the outer ring, an engine side drive plate disposed on an engine side of the outer ring and a clutch side drive plate disposed on a clutch side of the outer ring, the engine side drive plate and the clutch side drive plate being fastened to the outer ring by at least one rivet, the inner ring being fastened to the engine side drive plate, the drive side flywheel further including an inertial plate disposed on an engine side of the engine side drive plate, the inertial plate being fastened to the assembly of the outer ring, the engine side drive plate and the clutch side drive plate by the at least one rivet.

29. The torsional damper type flywheel device according to claim 28, wherein a radially outer portion of the outer ring axially protrudes toward an engine side, a radially inner surface of the axial protrusion of the outer ring contacting a radially outer surface of the engine side drive plate and a radially outer surface of the inertial plate.

30. The torsional damper type flywheel device according to claim 28, wherein the clutch side drive plate includes a plurality of radially inwardly opening windows for supporting the spring mechanism therein, the clutch side drive plate including smaller width portions located radially outside the windows and greater width portions located circumferentially between the smaller width portions so as to connect adjacent two smaller width portions to each other, radially inner portions of the greater width portions being locally formed thinner in thickness than the remaining portions of the clutch side drive plate.

31. The torsional damper type flywheel device according to claim 28, wherein the clutch side drive plate includes a plurality of radially inwardly opening windows for supporting the spring mechanism therein, the clutch side drive plate including smaller width portions located radially outside the windows and greater width portions located circumferentially between the smaller width portions so as to connect adjacent two smaller width portions to each other, radially inner portions of the greater width portions being locally cut so as to form radially inwardly opening recesses in the clutch side drive plate.

32. The torsional damper type flywheel device according to claim 28, wherein the engine side drive plate is bent at a radially intermediate portion thereof so that a radially outer portion of the engine side drive plate axially approaches an axial center of the flywheel device, the inertial plate being coupled to the radially outer portion of the engine side drive plate.

33. The torsional damper type flywheel device according to claim 28, and further comprising a control plate coaxial with and rotatable relative to the drive side flywheel and the drive side flywheel, the drive side flywheel including a drive plate, the at least one spring mechanism including at least one K spring and at least one K1 spring, wherein the K1 spring is parallel to the K spring connected between the drive side flywheel and the driven side flywheel, each of the engine side drive plate, the driven plate and the control plate being bent at a radially intermediate portion thereof so that a radially outer portion thereof axially approaches an axial center of the flywheel device.

34. The torsional damper type flywheel device comprising:
   a drive side flywheel including a clutch side drive plate;
   a driven side flywheel coaxial with and rotatable relative to the drive side flywheel; and
   at least one spring mechanism connected between the drive side flywheel and the driven side flywheel, wherein the clutch side drive plate includes a plurality of inwardly opening windows for supporting the at least one spring mechanism therein, the clutch side drive plate including smaller width portions located radially outside the windows and greater width portions located circumferentially between the smaller width portions so as to connect adjacent two smaller width portions to each other, radially inner portions of the greater width portions being locally formed thinner in thickness than the remaining portions of the clutch side drive plate.

35. The torsional damper type flywheel device comprising:
   a drive side flywheel including a clutch side drive plate;

a driven side flywheel coaxial with and rotatable relative to the drive side flywheel; and at least one spring mechanism connected between the drive side flywheel and the driven side flywheel, wherein the clutch side drive plate includes a plurality of inwardly opening windows for supporting the at least one spring mechanism therein, the clutch side drive plate including smaller width portions located radially outside the windows and greater width portions located circumferentially between the smaller width portions so as to connect adjacent two smaller width portions to each other, radially inner portions of the greater width portions being locally cut so as to form radially inwardly opening recesses in the clutch side drive plate.

* * * * *